(12) United States Patent
Azarkh et al.

(10) Patent No.: US 12,116,745 B2
(45) Date of Patent: Oct. 15, 2024

(54) REINFORCED GEOCELL AND A METHOD FOR PRODUCING THE SAME

(71) Applicant: OBSHCHESTVO S OGRANICHENNOY OTVETSTVENNOSTYU "MIKI", Moskovskaya obl., g. Khimki, mkr. (RU)

(72) Inventors: Mikhail Mikhailovich Azarkh, Moscow (RU); Aleksandr Vladimirovich Odinokov, Moscow (RU)

(73) Assignee: Mikhail Azarkh, Shoresh (IL)

( * ) Notice: Subject to any disclaimer, the term of this patent is extended or adjusted under 35 U.S.C. 154(b) by 731 days.

(21) Appl. No.: 17/064,960

(22) Filed: Oct. 7, 2020

(65) Prior Publication Data

US 2021/0017730 A1  Jan. 21, 2021

Related U.S. Application Data

(62) Division of application No. 15/442,970, filed on Feb. 27, 2017, now abandoned.

(51) Int. Cl.
| | |
|---|---|
| *E02D 17/20* | (2006.01) |
| *B29C 43/24* | (2006.01) |
| *B29C 48/00* | (2019.01) |
| *B29C 48/08* | (2019.01) |
| *B29C 65/00* | (2006.01) |

(Continued)

(52) U.S. Cl.
CPC ............ *E02D 17/202* (2013.01); *B29C 43/24* (2013.01); *B29C 48/00* (2019.02); *B29C 48/08* (2019.02); *B29C 65/00* (2013.01); *E01C 3/04* (2013.01); *E02B 3/122* (2013.01); *B29C 2793/0072* (2013.01); *E02D 2300/0084* (2013.01)

(58) Field of Classification Search
None
See application file for complete search history.

(56) References Cited

FOREIGN PATENT DOCUMENTS

RU     2459040 C1     8/2012

OTHER PUBLICATIONS

Behery_Yarn structural requirements for knitted and woven fabrics (2010) (Year: 2010).*

* cited by examiner

*Primary Examiner* — Robert J Grun
(74) *Attorney, Agent, or Firm* — Craft Chu PLLC; Andrew W. Chu

(57) ABSTRACT

A reinforced geocell is made of flexible polymeric strips arranged in rows and interconnected in a staggered order lengthwise to form a three-dimensional cell structure when stretched in the direction normal to surfaces of the strips. The strips are provided with drainage apertures and are reinforced in a longitudinal direction with reinforcing threads having at least two fibrous elements twisted along full lengths thereof. A method for producing a geocell includes extruding a polymeric material for producing a sheet material, laying out twisted reinforcing threads onto the sheet material, calendaring the sheet material when heated to 120 to 200° C. to press reinforcing threads into the sheet material, cutting a reinforced sheet material into sheets, perforating the sheets for producing drainage apertures, cutting the sheets into strips, and interconnecting the strips in a staggered order to form a three-dimensional cell structure.

10 Claims, 2 Drawing Sheets

(51) Int. Cl.
*E01C 3/04* (2006.01)
*E02B 3/12* (2006.01)

REINFORCED GEOCELL AND A METHOD FOR PRODUCING THE SAME

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to the construction industry, in particular to a geocell and a method for producing the same. The invention may be used in the oil-and-gas, transport and hydraulic engineering industries for reinforcing structural units and pitching weak bases of industrial and civil structures as well as shoreline slopes and water body channels.

2. Description of Related Art Including Information Disclosed Under 37 CFR 1.97 and 37 CFR 1.98

The closest analogue to the present invention is a reinforced geocell disclosed in Patent RU 2459040, Aug. 20, 2012. The geocell is formed from flexible high-density polyethylene (HDPE) strips arranged in several rows and interconnected in a staggered order along lengths of the strip, in order to form a cell structure when the strips are stretched in a direction normal to surfaces thereof. The strips are provided with drainage apertures having the shape of elongated rectangles with semicircles on short sides of the strips, and the strips are reinforced lengthwise with aramid or carbon reinforcing threads at a ratio, in wt. %, of aramid or carbon thread to HDPE of 0.3 to 3. Said structure is disadvantageous in that reinforcing threads may slide off the geocell web if shear stresses appear which leads to a reduction in strength of the geocell.

BRIEF SUMMARY OF THE INVENTION

The objective of the claimed group of inventions is to eliminate drawbacks of the closest analogue.

The technical effect of the invention is improved reliability of holding reinforcing elements in geocell strips as well as improved tensile strength of a geocell at stretch and shear loads.

This technical effect is achieved due to that a reinforced geocell is made of flexible polymeric strips arranged in rows and interconnected in a staggered order lengthwise to form a three-dimensional cell structure when stretching in the direction normal to surfaces of the strips, the strips provided with drainage apertures as well as reinforced by reinforcing threads in a longitudinal direction, wherein said reinforcing threads consist of at least two fibrous elements twisted along the whole length thereof.

Also, the technical effect is achieved in a method for producing a reinforced geocell, comprising: extruding a melted polymeric material for producing a sheet material, laying reinforcing threads onto the sheet material, calendering the sheet material with heating to a temperature ranging from 120 to 200° C. for the purpose of ensuring pressing said reinforcing threads into the sheet material, cutting a reinforced sheet material into sheets, perforating said sheets for producing drainage apertures, cutting said sheets into strips, and connecting the strips in staggered order to form a three-dimensional cell structure, said reinforcing threads consisting of at least two fibrous elements twisted along the whole length thereof.

Other embodiments of the invention are possible, where:
the reinforcing threads have 5 to 20 twists per centimeter;
the reinforcing threads are made of polyester or lavsan;
the reinforcing threads have thickness not more than 1 mm and are arranged with a transverse pitch ranging from 1 to 10 mm;
the strips are made from HDPE or a mixture of HDPE and low-density polyethylene (LDPE);
the drainage apertures have a shape of elongated rectangles with rounded corners;
when implementing the method, the reinforcing threads are impregnated with an adhesive composition before laying onto the sheet material;
when implementing the method, the sheet material is calendered for ensuring pressing the reinforcing threads to a depth at least 0.25 mm.

As distinct from known solutions, reinforcing elements in the form of the twisted reinforcing threads consisting of two or more fibrous elements are used in the claimed geocell. This configuration of the reinforcing threads ensures reliable holding thereof in the strips (or ribbons) of the geocell. Furthermore, it is found that the use of the twisted threads ensures improved tensile strength of the geocell at stretch and shear loads that cause bends of the strips of the geocell and the reinforcing elements themselves, thus, consequently, enabling to improve indentation resistance of a base (soil) reinforced by such the geocell.

BRIEF DESCRIPTION OF THE SEVERAL VIEWS OF THE DRAWINGS

The invention is illustrated by the accompanying drawings.

DETAILED DESCRIPTION OF THE INVENTION

Figure 1:
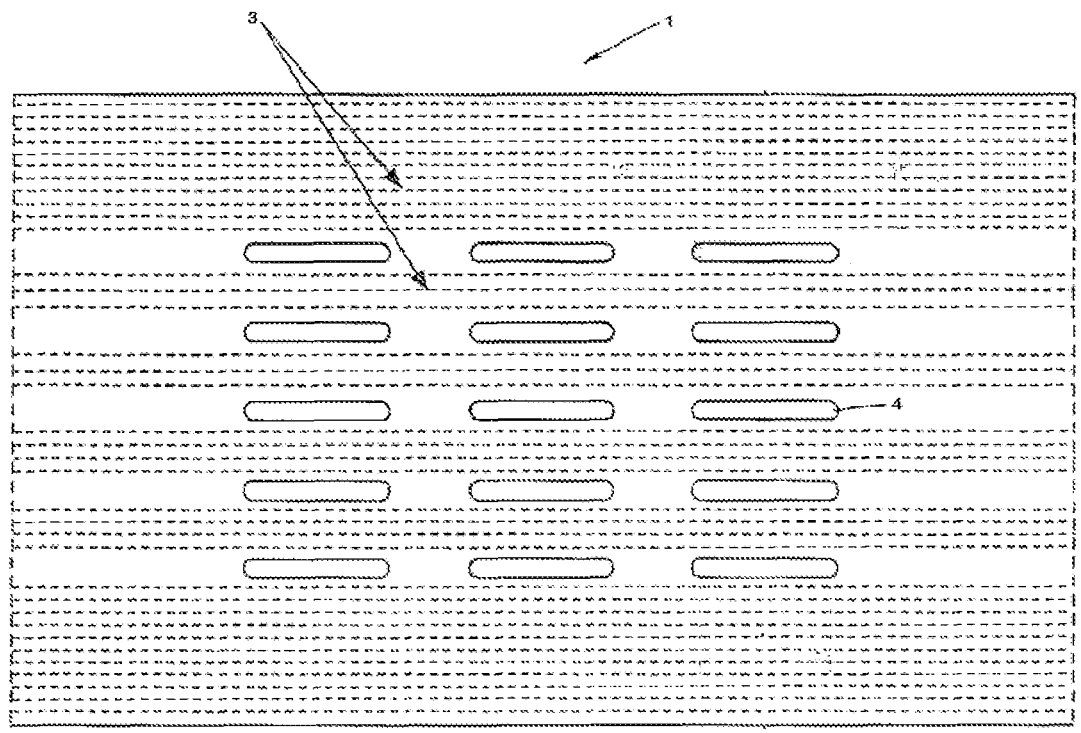
FIG. 1 shows a structure of the strips used for producing the geocell.
Figure 3:
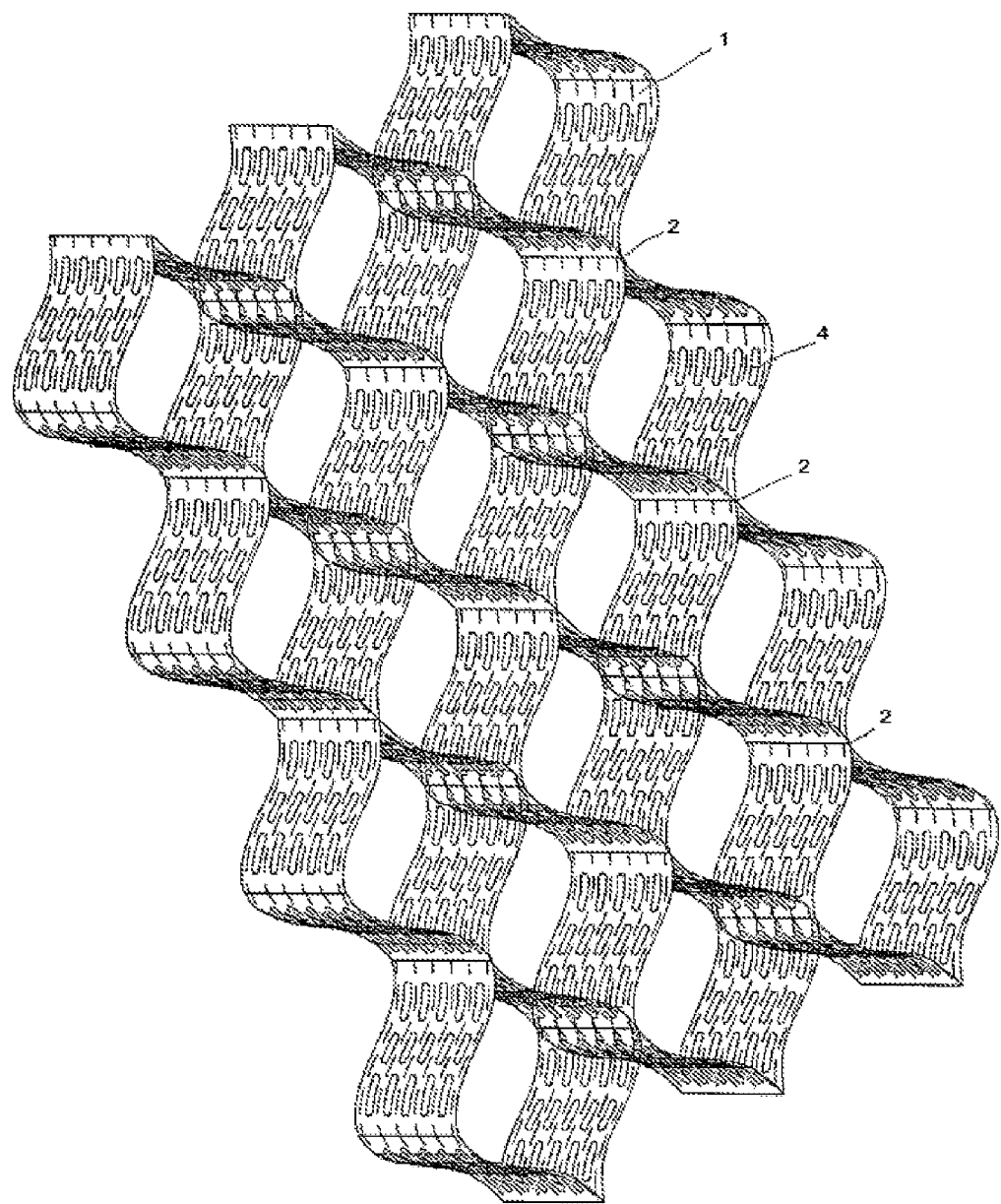
FIG. 3 shows a view of the geocell, according to the claimed invention.

The gas The claimed reinforced geocell (FIG. 3) consists of flexible strips (1) made of a sheet material (FIG. 1), which flexible strips (1) are arranged in rows and interconnected in a staggered order (seams (2)) by, e.g., ultrasonic welding or threads.

The strips (1) are made of a polymeric material, in particular, of HDPE or a mixture of HDPE and LDPE. The strips (1) may have a thickness of 1 to 2 mm.

Figure 2:
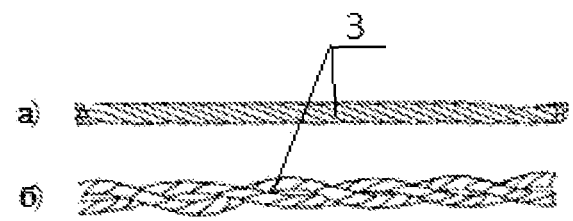
FIG. 2 shows a view of the reinforcing threads.

Further, the strips (1) are reinforced lengthwise with reinforcing threads (3) comprising two or more fibrous elements (fibers) twisted along a full length thereof (FIG. 2). Preferably, the fibrous elements have 5 to 20 twists per 1 centimeter of the lengths thereof. The reinforcing threads (3) may be made of polyester or lavsan and have a diameter up to 1 mm, and the reinforcing threads are pressed into the strip (1) to a depth at least 0.25 mm and arranged with a transverse pitch ranging from 1 to 10 mm.

The strips (1) are also provided with drainage apertures (4) having preferably the shape of elongated rectangles with rounded corners.

The disclosed geocell may be produced as follows.

A melted polymeric material is extruded for producing a polymeric sheet material. The twisted reinforcing threads are laid onto the sheet material produced, and the latter is calendered at a temperature ranging from 120 to 200° C. by using embossed rolls that ensure pressing the reinforcing threads to a depth at least 0.25 mm. In order to improve adhesion, the reinforcing threads may be preliminarily impregnated with an adhesive composition, e.g., with Latacril BM glue (TU (stands for technical regulations) 2385-403-00208947). A reinforced sheet material thus produced is roll-cooled and cut into sheets. Then, the sheets are perforated for producing drainage apertures. After that, the so produced perforated sheets are cut into strips (ribbons). The strips are interconnected in a staggered order by using ultrasonic welding and are sewn together with a thread, thus forming a three-dimensional cell structure. The final structure is stretched for producing a geocell.

EXAMPLE

According to the above disclosed method, a geocell was produced from polyethylene strips having a thickness of 1.5 mm and reinforced with twisted polyester threads having a thickness of 1 mm and consisted of two fibrous elements (threads) having a thickness of 0.5 mm each and 10 twists per cm. The threads were arranged with a transverse pitch of 2 mm. Also, the strips were provided with 20×4 mm rectangular drainage apertures with rounded ends.

For the purpose of comparison, a geocell was produced according to the closest analogue under the same parameters but with the use of non-twisted reinforcing threads.

The results of comparison between the disclosed structure and that known from the closest analogue are shown in Table 1.

TABLE 1

Characteristics of geocells produced according to the closest analogue and the claimed invention

| Parameter | Geocell produced according to the closest analogous solution | Claimed geocell |
|---|---|---|
| Thickness of the strip, mm | 1.5 | 1.5 |
| Tensile strength of the non-perforated strip at a maximum load, kN/m | 20.25 | 25.22 |

TABLE 1-continued

Characteristics of geocells produced according to the closest analogue and the claimed invention

| Parameter | Geocell produced according to the closest analogous solution | Claimed geocell |
|---|---|---|
| Tensile strength of the perforated strip at a maximum load, kN/m | 16.1 | 17.47 |
| Unit elongation of the perforated strip at a maximum load, % | 22.45 | 21.05 |
| Unit elongation of the non-perforated strip at a break point, % | 100.42 | 101.33 |
| Seam pull strength of the perforated strip, kN/m | 18.66 | 19.07 |
| Strength of an infilled compacted material reinforced by the geocell at shear loads, kg/cm$^2$ | 2.1 | 2.4 |

Thus, the claimed structure ensures reliable holding of the reinforcing elements in the geocell strips as well as improved strength of the geocell at stretching and shear loads.

We claim:

1. A reinforced geocell, comprising: flexible polymeric strips being arranged in rows and interconnected in a staggered order lengthwise and being stretched in a direction normal to surfaces of the strips so as to form a three dimensional cell structure; drainage apertures perforated into the strips; and reinforcing threads pressed into the strips in a longitudinal direction of the strips, wherein each reinforcing thread is comprised of at least two fibrous elements twisted along lengths thereof so as to have a twisted length at a depth of at least 0.25 mm from an exposed surface of a corresponding strip, within a corresponding strip.

2. The geocell according to claim 1, wherein each reinforcing thread has 5 to 20 twists per cm.

3. The geocell according to claim 1, wherein each reinforcing thread is comprised of polyester or polyethylene terephthalate.

4. The geocell according to claim 1, wherein the reinforcing threads have thickness of not more than 1 mm and are arranged with a transverse pitch ranging from 1 to 10 mm.

5. The geocell according to claim 1, wherein the strips are comprised of high density polyethylene (HDPE) or a mixture of HDPE and low density polyethylene (LDPE).

6. The geocell according to claim 1, wherein the drainage apertures are shaped as elongated rectangles with rounded corners.

7. A method for producing a three-dimensional reinforced cell structure, comprising the steps of: extruding a melted polymeric material so as to produce a sheet material, laying reinforcing threads onto the sheet material, calendering the sheet material heated to 120 to 200° C and pressing the reinforcing threads into the sheet material so as to form a reinforced sheet material, cutting the reinforced sheet material into sheets, perforating the sheets so as to form drainage apertures through the sheets, cutting the sheets into strips, the reinforcing threads being in a longitudinal direction of a corresponding strip, and connecting the strips in a staggered order so as to form the three-dimensional reinforced cell structure, wherein each reinforcing thread is comprised of at least two fibrous elements twisted along lengths thereof so as to have a twisted length at a depth of at least 0.25 mm from an exposed surface of a respective strip, within a respective strip.

8. The method, according to claim 7, further comprising the step of:
    impregnating the reinforcing threads with an adhesive composition before the step of laying reinforcing threads onto the sheet material.

9. The method, according to claim 7, wherein the reinforcing threads are comprised of at least one of a group consisting of: polyester and polyethylene terephthalate.

10. The geocell according to claim 1, wherein the two fibrous elements have a transverse pitch ranging from 1 to 10 mm.

\* \* \* \* \*